United States Patent [19]

Smith

[11] 4,432,299
[45] Feb. 21, 1984

[54] IMPULSE NOISE GENERATOR

[75] Inventor: Ralph N. Smith, Cockatoo Valley, Australia

[73] Assignee: The Commonwealth of Australia, Canberra, Australia

[21] Appl. No.: 339,446

[22] PCT Filed: Apr. 10, 1981

[86] PCT No.: PCT/AU81/00043
§ 371 Date: Dec. 22, 1981
§ 102(e) Date: Dec. 22, 1981

[87] PCT Pub. No.: WO81/03081
PCT Pub. Date: Oct. 29, 1981

[30] Foreign Application Priority Data

Apr. 24, 1980 [AU] Australia ............................. PE3277

[51] Int. Cl.³ ........................................... G10K 10/00
[52] U.S. Cl. ................. 116/137 R; 137/557; 181/143
[58] Field of Search ............... 116/137 R; 124/73, 75; 181/143, 19

[56] References Cited

U.S. PATENT DOCUMENTS

| 2,991,781 | 7/1961 | Ayala | 124/11 |
| 3,249,177 | 5/1966 | Chelminski | 181/118 |
| 3,379,272 | 4/1968 | Brooks | 181/0.5 |
| 3,457,893 | 7/1969 | Lavalier | 116/137 R |
| 4,099,445 | 7/1978 | Singelman et al. | 89/7 |

FOREIGN PATENT DOCUMENTS

| 286565 | 5/1966 | Australia | 181/0.5 |
| 491910 | 11/1976 | Australia | 116/137 R |
| 2616959 | 4/1976 | Fed. Rep. of Germany | 116/137 R |

Primary Examiner—Daniel M. Yasich
Attorney, Agent, or Firm—Cushman, Darby & Cushman

[57] ABSTRACT

An impulse noise generator having means to store a volume of compressed gas and suddenly to release same to eject through a nozzle (14) comprising a body (4) having a hollow stepped piston (1) arranged to move forward by gas pressure admitted through an inlet (9) when a spring-loaded valve (15) is closed and including a pressure chamber (7) to which gas is admitted through the valve (15) when the piston (1) is at the forward and of its stroke, and gas release means to cause the piston (1) to move back rapidly to exhaust the gas from the chamber (7) to the nozzle (14).

10 Claims, 4 Drawing Figures

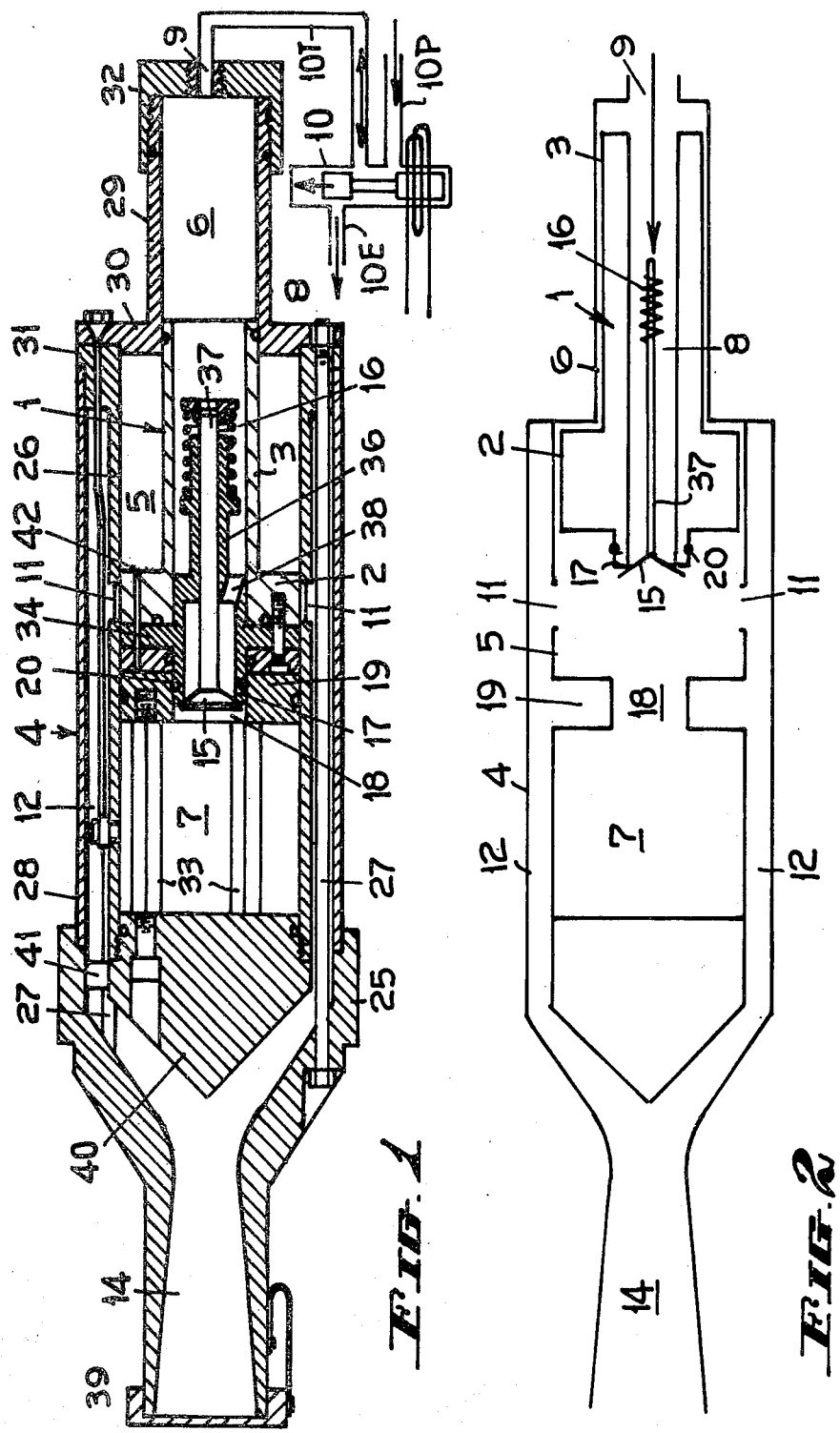

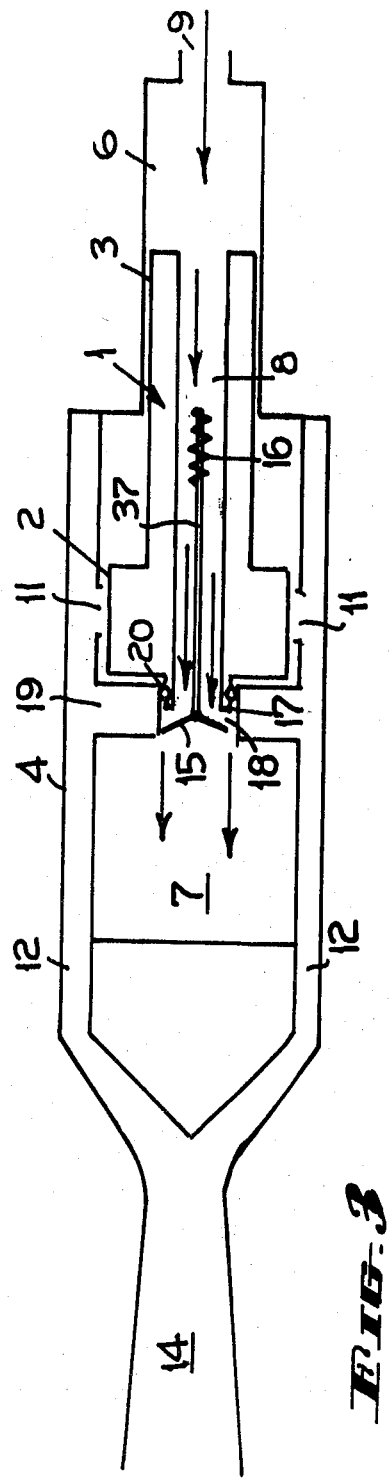
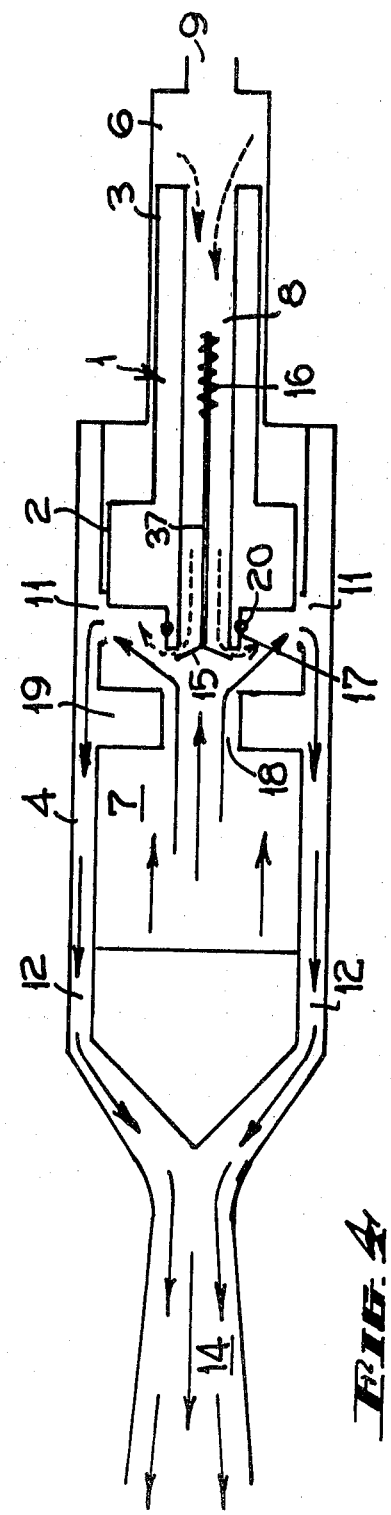

IMPULSE NOISE GENERATOR

This invention relates to an impulse noise generator which can produce high level sound of short duration.

One of the uses to which such a device can be put is to develop hearing protection aids for personnel using modern artillery which produces sound level in the vicinity of 180 dB, but other uses will be apparent.

Devices of this type are already known in which a pressure chamber is charged and the compressed gas suddenly released by the rupturing of a diaphragm, or by movement of a piston, the rapid release of gas producing the required noise.

It is known for instance according to U.S. Pat. No. 2,991,781, CARL A AYALA, to provide a toy which has as its object the production of a high noise level, which device includes an air chamber sealed by a displaceable member, the chamber and the displaceable member being designed in such a way that air pressure on the displaceable member is minimized or directed so that the components of force tending to displace the member are extremely small until a predetermined pressure is reached in the chamber, whereupon the mechanism is arranged to almost instantaneously direct the maximum pressure to suddenly and violently displace the member.

Another U.S. Pat. No. 4,099,445, DIETRICH SINGLEMANN, relates to a generating system for propelling a projectile in a firearm which uses a pressure differential piston operating in a stepped bore, the step distance being designed in conjunction with valve means to allow the piston to be forced backwardly in a working stroke to produce a force for expelling the projectile through the bore at the opposite end of the chamber.

An Australian Patent No. 286,565, BOLT ASSOCIATES INC., describes sound impulse generation means comprising a larger and a smaller piston joined by a connecting member and positioned in a common stepped bore with a space between arranged to be pressurised by a gas, the smaller piston being positioned to uncover annular gas discharge ports when the pistons move from a cocked position, actuation being by moving the joined pistons to the cocked position by separate pressure means to cause the larger piston to engage a seal to isolate the face remote from the gas space between the pistons from that space, and at the same time causing the smaller piston to seal off the smaller bore from the larger bore to isolate the discharge ports in the smaller bore from the gas space, at which stage high pressure is built up in the gas space from a supply joined to that space with the pressure of gas acting against the larger piston to hold the pistons in a cocked position. To fire the device, pressure is applied to the remote face of the larger piston to move the piston to disengage the seal and place both sides of the larger piston into communication with the gas in the space and to cause the smaller piston to rapidly move the pistons to vent the pressure gas througn the discharge ports.

An object of the present invention is to provide a new and improved device which can produce a required sound level of short duration.

A further object is to allow the device to be automatic and programmed at required intervals of time.

A still further object is to avoid production of noxious fumes or high temperatures which would constitute a fire hazard.

The method of generating a noise according to this invention uses a hollow body having freely movable within it a stepped piston in a stepped bore in the body and including a pressure gas inlet to the smaller part of the bore in the body and ports through the wall of the larger part of the stepped bore in the body, which method comprises forcing the said piston forwardly in the said bore by applying gas pressure to the smaller diameter part of the said bore, causing the larger part of the said piston to seal to a pressure chamber at the end of the said larger part of the bore, causing a valve in the said stepped piston to open to bring the pressure chamber to the pressure of the supply, holding the device in readiness to produce the sound by maintaining pressure to the said bore, releasing the pressure stored in the small bore to cause the pressure stored in the said pressure chamber to act against the larger part of the said piston to drive the piston back to allow the high pressure fluid from at least the said pressure chamber to pass with high velocity through the said annular ports in the wall of the said bore, and venting the said discharge gas through a discharge nozzle.

According to a convenient form the impulse noise generator, which has means to store a volume of compressed gas and suddenly release same to eject the gas through a nozzle, comprises a body having a stepped bore, a free piston having one end in the smaller diameter part of the bore and the other end in the larger part of the bore, a pressure chamber in the body communicating with the larger diameter of the bore through an aperture in a wall in the body between the chamber and the larger diameter bore, means on the piston to close the aperture when the piston is forwardly projected, a valve in the piston loaded to close against pressure applied to the said small diameter bore, the smaller diameter bore being adapted to be placed into communication with a gas pressure supply through a valve which either allows the pressure gas to flow to the smaller diameter bore or to vent the smaller diameter bore to atmosphere, an annular port means through the wall of the body which defines the larger bore, the annular port communicating with a discharge nozzle.

In order however that the nature of the invention will be fully appreciated an embodiment thereof will now be decribed with reference to the accompanying drawings in which:

FIG. 1 is a longitudinal central section of the device according to this invention.

FIG. 2 is a schematic view showing the device with the stepped piston in a position where pressure gas is applied to its smaller end to project the stepped piston forwardly, the valve at this stage being closed.

FIG. 3 is a similar view but showing the piston in its fully forwardly projected position with the valve open, at which stage the pressure gas passes through the bore in the stepped piston and charges the pressure chamber in the body until the pressure in the chamber and in the bore is equalised whereupon the valve closes as shown and the device is set to be triggered, and FIG. 4 is a similar view to FIGS. 2 and 3 but showing the condition when the smaller bore is vented to the atmosphere allowing the pressure from the pressure chamber to rapidly drive back the stepped piston until it uncovers circumferential ports which allow the high pressure gas flow to eject through the nozzle.

The invention uses a free piston 1 which is stepped in diameter to have a larger diameter head portion 2 and a smaller diameter portion 3, and this piston is axially movable in a body 4 having a stepped bore 5-6 of the required diameter to allow the two parts 2 and 3 of the piston 1 to be accommodated in the selected diameters of the bore.

The body 4 has in it at one end of the larger diameter bore 5 a gas pressure chamber 7 into which pressure gas can be fed through a gas-transfer port 8 through the stepped piston 1, the smaller bore 6 of the body communicating through a transfer aperture 9 with a three port control valve 10, shown diagramatically in FIG. 1, adapted to be connected to a pressure source 10P which allows pressure to be built up within the device but also allows the pressure to be released from the small bore end through the line 10E of the three port control valve when a noise impulse is required, the transfer aperture 9 being in communication with the control valve 10 through the line 10T.

The larger diameter head portion 2 of the piston 1 covers an annular port 11 when the stepped piston 1 is projected forward in the bore to a triggered position, and this port leads to an annular space 12 which in turn terminates in a flared nozzle 14 from which the gas flow is distributed to the atmosphere to give the high intensity noise.

The stepped piston 1 has at its head portion 2 a sealing valve 15 which is loaded by a spring 16 in such a manner that gas caused to flow under pressure into the rear end of the smaller bore 6 in the body 4 will flow through the gas transfer port 8, which extends through the stepped piston, and through the sealing valve 15, by opening the valve by differential pressure, and into the storage chamber 7 in the body 4 until a balanced pressure is achieved throughout the unit. During forward movement of the piston 1 the sealing valve 15 is closed by the pressure of its spring, but when the piston 1 reaches the forward end of its stroke, an extension 17 on the head portion 2 of the piston 1 fits into an opening 18 in a wall 19 which divides the larger diameter bore 5 from the storage chamber 7, and the valve is then opened by the gas fed to it but closes again under action of the spring 16 when the pressure in the storage chamber 7 is equal to the pressure in the bore of the piston. The extension 17 has an "O" ring seal 20 on it to seal to the wall of the opening 18.

In constructing the device the body is formed to have a nozzle member 25 joined to the end of an inner cylinder 26 by tension rods 27, an outer cylinder 28 being positioned between the nozzle member 25 and the rear end of the inner cylinder 26 to form between the two cylinders the annular space 12 which communicates on the one hand with the flared nozzle 14 of the nozzle member 25 and through the annular ports 11 with the bore in which the larger diameter head of the stepped piston 1 operates.

The cylinder 29 which defines the smaller bore 6, has a flange 30 on it secured to the rear end 31 of the inner cylinder by studs, not shown, and has a cap 32 closing its end in which is formed the transfer aperture 9 to which is connected a line to the three port valve 10.

The dividing wall 19 is held by spacers 33 to define between it and the nozzle member 25, the storage chamber 7.

The larger diameter portion 2 of the piston 1 has attached to it, by a flange 34, a support member 36 which carries the valve 15, the valve 15 having a stem 37 engaged by the spring 16, the support member 36 having a duct 38 through to allow gas flow from the gas transfer port 8 to the valve 15 and past it, when open, into the storage chamber 7, the body of the support member 36 being positioned in the bore 6 of the stepped piston 1.

A removable cap 39 is shown to normally close the nozzle but this is removed before a noise is to be produced.

The inner part 40 of the nozzle member 25 is joined to the outer part by spacers 41.

The operation of the device is as follows:

Assuming that the stepped piston 1 is in its retracted position in the stepped bore 5-6, as shown in FIG. 3, gas such as air or nitrogen is caused to flow into the small bore 6 of the stepped cylinder causing the stepped piston 1 to be projected forwardly because the valve 15 at the other end of the stepped piston 1 is held closed by the spring 16 which is arranged to act as a loading device. When however the piston 1 reached the end of its traverse, as shown in FIG. 3, a seal is made between the extension 17 of the head of the piston 1 and the wall 19 and the valve 15 then opens to cause a flow of gas into the gas pressure storage chamber 7 until equalization of the pressure in the chamber 7 and within the smaller diameter bore 6 is achieved. The valve 15 then closes.

The gas is preferably fed into the device by an electrically operated three port valve 10 described earlier herein so arranged that in one position the valve admits gas to the small bore 6 of the body while in the other position it closes off the supply and vents part of the gas stored in the small bore 6 and the hollow of the piston to the atmosphere.

The cycle begins with the piston 1 in any position along the cylinder, but when gas is admitted by the valve 10 the piston 1 is moved forward to what we term the triggered position where the piston seals to the wall 19 of the storage chamber and the valve in the head of the piston opens and gas flows into the storage chamber until the pressure on both sides of the piston is equalized and gas flow ceases, see FIG. 3.

At this stage the piston 1 is held in a triggered position because the area of the back of the smaller diameter portion 3 of the piston is greater than the area of the extension 17, and since the pressure is equalized there is a net force on the back of the piston.

When however the control valve 10 is actuated again the gas behind the piston 1 vents to atmosphere and this causes the pressure in the bore 6 to fall until the pressure in the storage chamber 7, acting on the extension 17, causes the piston to move rearwardly. After the piston has moved to short distance the seal on the extension 17 separates from the wall 19 of the storage chamber 7 and this pressure then acts on the full face of the larger diameter portion 2 of the piston 1, the result of this being that the piston accelerates rapidly and has reached a high velocity by the time it begins to open the annular ports 11, which opening can take place in as short a time as 1 millisecond. The gas then flows through the ports 11, along the annular space 12 and through the nozzle 14, where it forms a shock wave which causes the noise, this position being shown in FIG. 4.

While the piston 1 is being driven along the stepped bore 5-6 the gas behind the piston is venting through the control valve 10 but because of gas flow resistance in the supply line and the relatively small size of the valve 10 relatively little can escape during the rapid movement of the piston 1 and the remainder is compressed until it again equals the pressure on the driving side, but acting on a much smaller area, at which point the valve 15 opens again and most of the gas behind the smaller portion of the piston 1 passes through the valve 15 and takes place in the noise generation.

The piston is finally cushioned by the air which remains trapped in the annular space 5 behind the main piston, a small bleed 42 between the front and back of the large diameter head portion being however provided.

From the foregoing it will be realized that a simple and effective device is provided which has only one major moving part in the nature of a stepped piston and valve.

It will be realized also that the device can be remotely controlled because charging prior to an active stroke is effected simply by allowing a gas flow into the unit througgh the three port valve 10 which as said can be electrically controlled and when it is desired to produce the noise it is only necessary to bleed some of the gas from the unit to the atmosphere for the explained sequence to occur.

I claim:

1. The method of generating a noise using a hollow body having freely movable within it a stepped piston in a stepped bore in the body and including a pressure gas inlet to the smaller part of the bore in the body and annular ports through the wall of the larger part of the stepped bore in the body, which method comprises forcing the said piston forwardly in the said bore by applying the gas pressure through a supply line to the small diameter part of the said bore, thereby causing the larger part of the said piston to seal to a pressure chamber at the end of the said larger part of the bore, causing a valve in the said stepped piston to open to bring the pressure chamber to the pressure of the supply, holding the device in readiness for producing the sound by maintaining pressure to the said smaller bore, releasing gas stored in the small bore to cause the gas pressure in the said pressure chamber to act against the larger part of the said piston to drive the piston back to allow the high pressure gas from at least the said pressure chamber to pass with high velocity through the said annular ports in the wall of the said bore, and venting the said gas through a discharge nozzle so as to create a high intensity noise.

2. The method of claim 1 wherein the gas from the said smaller bore is at least in part ejected through the said valve together with the gas from the said pressure chamber due to the rapid driving back of the said piston and resistance to back flow through the said supply line.

3. An impulse noise generator for carrying out the method of claim 1 wherein gas is compressed and suddenly released by a movable piston to discharge to the atmosphere, characterised by a stepped piston with a gas transfer port axially through it, a body having a stepped bore housing the said piston and having annular discharge ports medially in the larger diameter of the stepped bore, a gas storage chamber in the said body communicating with the larger diameter part of said bore through a transfer opening in a division wall in the said body, a pressure gas inlet to the smaller diameter part of the said bore, and a spring-loaded valve in the said transfer port arranged to allow gas flow through the said port to the said pressure chamber, the said piston being arranged to have its larger diameter part seal to the said transfer aperture over a cross-sectional area smaller than the cross-sectional area of the smaller diameter part of the said piston so that when the piston is advanced by gas pressure in the smaller diameter part of the said bore in the body to a cocking position at the end of a forward stroke the said spring-loaded valve opens to allow gas flow to the said gas storage chamber until pressure equalization occurs whereupon the said valve closes and the piston is held in the cocked position by the pressure on the smaller diameter piston but on a triggered reduction of the pressure in the said smaller bore the greater pressure from the said pressure chamber rapidly forces the said stepped piston back acting on the area of the larger diameter part of the stepped piston, to uncover the said discharge ports and produce the said noise.

4. An impulse noise generator having means to store a volume of compressed gas and suddenly release same to eject the gas through a nozzle to the atmosphere creating a noise comprising a body having a stepped bore, a free piston having one end in the smaller diameter part of the said bore and the other end in the larger part of the said bore, a pressure chamber in the said body communicating with the larger diameter of the said bore through an opening in a wall in the said body between the said pressure chamber and the said larger diameter part of the said bore, said transfer aperture having a lesser cross-sectional area than the cross-sectional area of the said smaller bore, said opening having a lesser cross-sectional area than the cross-sectional area of the said smaller diameter part of the said bore means on the said piston to close the said opening when the said piston is forwardly projected, a valve in the said piston loaded to close against pressure applied to the said small diameter part of the said bore, said smaller diameter bore being adapted to be placed into communication with a gas pressure supply through a control valve which either allows the pressure gas to flow to the said smaller diameter part of the said bore or to vent the said smaller diameter part of the said bore, and annular port means through the wall of the body which defines the said larger bore, said annular port means communicating with a discharge nozzle.

5. An impulse noise generation according to claim 4 wherein the said noise is produced when pressure of the said gas supply in the said smaller bore is lowered by venting gas through the said control valve.

6. An impulse noise generator according to claim 4 or 5 wherein the body comprises a nozzle member having a first annular space communicating with a gas discharge nozzle, an inner and outer coaxially aligned cylinder to define a second annular space communicating with the first said annular space, said cylinders being joined to the said nozzle member, a smaller diameter cylinder joined to the said inner and outer cylinders at one end and coaxial therewith and in communication with the space defined by the bore of the said inner cylinder, a gas inlet to the end of the bore of the smaller diameter cylinder remote from its junction with the inner and outer cylinders, and annular ports through the wall of the said inner cylinder intermediate the ends thereof to connect the said space defined by the said inner cylinder with the said second said annular space.

7. An impulse noise generator according to claim 6 wherein the said inner cylinder has in it a dividing wall spaced from the said nozzle member and having through it the said opening to form between the said nozzle member and the said wall a pressure chamber communicating through the said opening with that part of the bore defined by the said inner cylinder adjacent to the said smaller cylinder.

8. An impulse noise generator according to claim 6, wherein the said stepped piston comprises a larger diameter piston head slidable in the bore of the said inner cylinder between the said dividing wall and that end of the cylinder joining the said smaller cylinder, and wherein the smaller diameter portion of the said piston is slidable in the bore of the said smaller cylinder, said stepped piston having a coaxial bore through it forming a gas transfer port.

9. An impulse noise generator according to claim 6 wherein a coaxial bore has in it a support member which has a duct extending generally axially through it, said support member projecting beyond the said bore to form a piston extension of a diameter to fit into and seal the opening in the said dividing wall when the said piston is forwardly projected, the said support member having in it the said valve which is arranged to open when gas pressure in the bore of the said smaller cylinder is greater than gas pressure in the said pressure chamber.

10. An impulse noise generator according to claim 6 wherein the said nozzle member comprises an outer part and an inner part joined by spacers to define the said first annular space.

* * * * *